July 16, 1940.  C. A. BULKELEY  2,207,714
AIR CONDITIONING APPARATUS
Filed Feb. 19, 1936
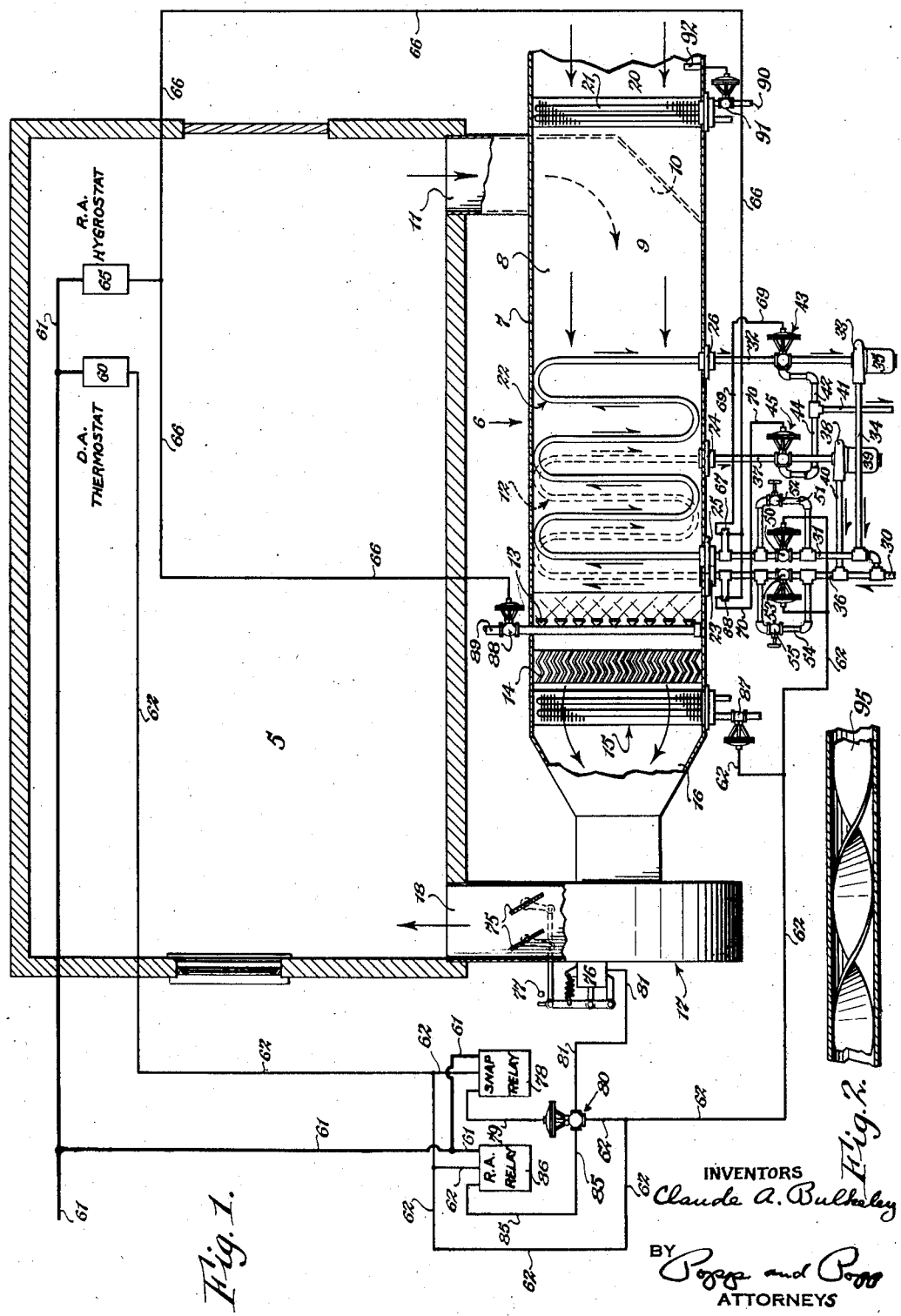
INVENTORS
Claude A. Bulkeley
BY Pogge and Pogge
ATTORNEYS Patented July 16, 1940

2,207,714

UNITED STATES PATENT OFFICE 2,207,714

AIR CONDITIONING APPARATUS

Claude A. Bulkeley, New York, N. Y., assignor to Niagara Blower Company, New York, N. Y., a corporation of New York Application February 19, 1936, Serial No. 64,726

10 Claims. (Cl. 257—3)

This invention relates to a method and apparatus for conditioning air in and ventilating an enclosure and for cooling, heating, dehumidifying and humidifying the air in the enclosure as conditions may require. The apparatus and control can be used for so-called comfort air conditioning, as in homes and theaters, where the primary object is to maintain the air at the temperature and relative humidity most comfortable to the occupants and also for so-called industrial air conditioning where it is essential or desirable to maintain, within close limits, a definite relative humidity or a definite temperature, or both.

The principal object of this invention is to provide a simple control system for maintaining, within a very close range, the desired condition of relative humidity and temperature within an enclosure consisting, essentially, of a hygrostat controlling the temperature of the cooling medium and a thermostat controlling the rate of flow of the cooling medium. With a closed coil cooling system it has been found that this control system will accurately maintain the desired condition of temperature and relative humidity in the enclosure with a minimum expenditure of refrigeration.

Another object of the present invention is to provide such an air conditioning apparatus which can be used for cooling and dehumidifying in the summertime and heating and humidifying in the wintertime; in which the desired movement of air in the enclosure is secured by recirculating the enclosure air through the apparatus and the desired amount of fresh air mixed with this recirculated air; in which the preponderance of the cooling and dehumidifying is performed on the fresh air, the recirculated air being substantially at the temperature and relative humidity desired; and in which the control system is simple and inexpensive and is not liable to get out of order and require adjustment.

Another object is to include as a part of the control system a thermostatic control of not only the amount of cooling medium employed but also the amount of air handled by the air conditioning apparatus and admitted to the enclosure. To this end means are provided responsive to the temperature in the enclosure for providing a maximum air delivery when maximum cooling or heating is required and for cutting down the air delivery when less cooling or heating is required until the point is reached where the minimum required for ventilation and air movement in the enclosure is being supplied.

In the accompanying drawing:

Fig. 1 is a plan view of an enclosure and showing, diagrammatically, an air conditioning apparatus and control system embodying my invention.

Fig. 2 is a longitudinal section through one of the tubes of the cooling coils.

In the following description it will be understood that the reference to thermostats and thermostatic control refers to a dry bulb thermostat and to a control responsive to the dry bulb temperature in the enclosure, and that the term hygrostat designates an instrument which is responsive to the relative humidity in the enclosure.

In its general organization this invention comprises means for drawing fresh air from the outside and room air from the enclosure and passing it, counter flow, over a multiple pass cooling and dehumidifying coil, the fresh air being directed against that part of the cooling coil through which the cool water or other cooling medium always passes when cooling and dehumidification is being effected, so that the greater part of the cooling and dehumidification is performed on the fresh air, together with means responsive to the dry bulb temperature in the enclosure for controlling the rate of flow of the cooling medium through the coils and means responsive to the relative humidity in the enclosure for controlling the temperature of the cooling medium so as to maintain, within very close limits, the temperature and relative humidity desired within the enclosure. Another feature of the invention consists in admitting the maximum amount of air from the air conditioning apparatus to the enclosure only when maximum heating or cooling is desired and in cutting down the amount of air so admitted in response to the enclosure temperature as less heating or cooling is required.

The numeral 5 represents an enclosure, such as an auditorium or processing room, the air of which is conditioned, under automatic control, by an air conditioning apparatus indicated generally at 6. The air conditioning apparatus 6 includes a casing 7 having a horizontal partition 8 forming an upper fresh air passage 9 and a lower recirculated air passage 10. In order to secure the desired air movement in the room and also to provide for adequate cooling under heavy load conditions room air is drawn out through a duct 11 into the passage 10 below the partition 8. This room air flows by a series of passes of a serpentine cooling coil 12 through which a cooling medium flows when cooling and dehumidification is being performed and then passes a series of sprays 13, which are operative when humidifying is performed and then passes through eliminator plates 14 which whip the air back and forth and remove any entrained moisture from the air. The air then passes around heating coils 15 into a fan inlet chamber 16 from which it passes into the inlet of a fan 17 which redelivers the air to the room 5 through a duct 18.

The fresh air is drawn in through a fresh air inlet duct 20, past pre-heating coils 21 and through the passage 9 above the horizontal partition 8. The fresh air then flows by a series of passes of a serpentine cooling coil 22 and then past the humidifying sprays 13, eliminator plates 14, heating coil 15 and fan inlet chamber 16, mixing with the room air and being discharged into the room by the fan 17 through the duct 18.

The cooling coils 12 and 22 are conventially illustrated and a more detailed description of the construction of these cooling coils will be found in the prior Bulkeley Patents No. 2,001,704 dated May 21, 1935, and No. 2,006,344, dated July 2, 1935. Each of the cooling coils 12 and 22 consists of a plurality of serpentine tubes arranged one above the other and the corresponding ends of all of the tubes of the cooling coil 12 are connected by an inlet header 23 and the opposite ends of the several tubes of this coil are connected with an outlet header 24. Similarly, the several serpentine tubes constituting the fresh air cooling coil 22 have their corresponding ends connecting with an inlet header 25 and the other ends of these tubes are connected with an outlet header 26. It will be understood that each of the coils 12 and 22 can be sectionalized as shown in the said Patent No. 2,001,704. It can be observed that the flow of the refrigerating medium through the cooling coils 12 and 22 is in the opposite direction from the air flow. It will also be observed that the tubes constituting the fresh air coil 22 are longer and include more passes than the tubes constituting the recirculated air coil 12 for the purpose set forth in the said prior Patent No. 2,001,704. The refrigerating medium is admitted to the coils 12 and 22 at a temperature below the dewpoint of the passing air so that that part of the passing air coming in contact with the final pass or passes of each coil is chilled below its dewpoint and moisture is precipitated out of the air so as to secure dehumidification as well as cooling. Only a very short section at the end of the coil from which the air leaves is required to be cooled below the dewpoint of the air in order to effect the necessary dehumidification.

It has been found that the rate of flow of the refrigerating medium through the cooling coils determines the cooling effect of the coils, i. e. the removal of sensible heat but has a relatively small influence on the dehumidifying effect of the coils. On the other hand, the entering temperature of the cooling medium determines the dehumidifying effect of the coils as well as the cooling effect thereof providing, of course, this temperature is appreciably below the dewpoint of the air. It will therefore be seen that a very simple control for maintaining, within very close limits, the desired relative humidity and temperature in the enclosure 5 can be achieved by the simple expedient of controlling the rate of flow of refrigerant through the coils in response to the dry bulb temperature of the air in the room and by controlling the entering temperature of the cooling medium entering the cooling coils in response to the relative humidity of the air within the enclosure. By this means if the temperature in the room rises the flow of cooling medium through the coils is increased without substantially increasing the dehumidifying effect of the coils. If the relative humidity in the room rises above the setting of the hygrostat it will operate to decrease the initial temperature of the cooling medium, thereby increasing the dehumidifying effect of the cooling coils without greatly increasing the cooling effect. It will be seen that by thermostatically controlling that condition of the cooling medium in a cooling coil which most largely influences the cooling effect of the coil in removing sensible heat and hydrostatically controlling that condition of the cooling medium in the cooling coil which most largely influences the dehumidifying effect in the removal of latent heat, an economy in refrigeration is effected since useless cooling of the air is not done to secure the desired dehumidification and useless dehumidification of the air is not done to secure the desired cooling of the air.

To this end cooling medium is supplied under pressure to both of the coils from a supply pipe 30. This cooling medium can be in the form of brine or cold water and is preferably supplied at a constant temperature of such low degree as to permit of lowering the dewpoint of the air passing the cooling coils to the minimum degree desired. The cooling medium is also available in such quantity as to take care of the maximum heat load imposed upon the apparatus. It will also be understood that the cooling water can be supplied from any suitable natural or artificial source and that any other form of cooling medium can be used, such as a liquid refrigerant expanded directly in the cooling coils, the entering temperature of such direct expanded cooling medium and the mean temperature of the coils being suitably controlled for this purpose.

The cooling medium from the supply pipe 30 can pass through a branch pipe 31 to the inlet header 25 of the fresh air cooling coil 22. The cooling medium so supplied flows through the cooling coil 22 counter to the fresh air flow and into the outlet header 26. From the outlet header the cooling medium is withdrawn through a pipe 32, by a pump 33, the outlet of which is connected by a pipe 34 with the branch pipe 31 leading to the inlet header of the fresh air cooling coil. The pump 33 is driven by an electric motor 35.

Similarly, the cooling medium is supplied to the recirculated air cooling coils from the supply pipe 30 by a branch pipe 36 which connects with the inlet header 23 of the recirculated air coils 12. The outlet header 24 of the recirculated air cooling coils is connected by a pipe 37 with the inlet of a pump 38 driven by an electric motor 39. The outlet pipe 40 of the pump 38 connects with the branch pipe 36 leading to the inlet header 23 of the recirculated air cooling coils 12. That part of the cooling medium not recirculated by the pumps 33 and 38 is returned to the refrigerating apparatus (not shown) by a common return pipe 41, one branch 42 of which connects with a three-way diaphragm valve 43 located in the return pipe 32 between the fresh air outlet header 26 and the recirculation pump 33. The other branch 44 of the common refrigerating medium return pipe 41 connects with a three-way diaphragm valve 45 located in the return pipe 37 between the outlet header 24 of the recirculation air cooling coil 12 and the recirculating pump 38.

The amount of cooling medium admitted to the fresh air coil 22 is controlled by a reverse acting diaphragm valve 50 and a by-pass 51 is provided around this valve having a manually operable valve 52, the opening of which permits a minimum amount of cooling medium to be admitted to the fresh air coil 22 when the diaphragm valve 50 is completely closed. Similarly, a reverse acting diaphragm valve 53 regulates the amount of cooling medium admitted to the recirculated air coil 12, a by-pass pipe 54 being provided around this diaphragm valve 53 and including a hand operated valve 55 which, when opened, provides a minimum flow of cooling medium through the recirculated air coil 12. The reverse acting valves 50 and 53 are so adjusted that the diaphragm valve 50 opens in advance of the diaphragm valve 53 so that under all conditions of cooling the fresh air cooling coil 22 is operative and the recirculated air cooling coil 12 is only operative under heavier load conditions. Conversely, of course, the diaphragm valve 53 closes in advance of the diaphragm valve 50 so as to cut out the recirculated air coil 12 first as the load on the apparatus is relieved.

As previously stated the rate of flow of the cooling medium through the fresh air coil 22 and the rate of flow through both the fresh air coil 22 and the recirculated air coil 12 is adjusted in accordance with the dry bulb temperature of the room 5 so as to secure the desired cooling of the air in the room. For this purpose a direct acting dry bulb thermostat 60 is shown as being located in the room 5 and as having its sensitive parts exposed to the air in this room, although it will be understood that this thermostat could be located in the return air passage 11 or that room air could be brought to the sensitive parts of the thermostat if it were desired to locate the thermostat on a remote instrument panel. The thermostat 60 is of the direct acting pneumatic type and is supplied with air pressure at, say 15 pounds, from an air pressure line 61. The outlet line 62 connects directly with both of the reverse acting diaphragm valves 50 and 53 so that upon rising room temperature the pressure in the thermostat outlet line rises and progressively opens the diaphragm valves 50 and 53 so as to admit increasing amounts of cooling medium first to the fresh air coil 22 until the full rate of flow of the cooling medium obtains through this coil and then to the recirculated air coil 12 until the full rate of flow obtains in this coil, under which condition the apparatus is operating under maximum load conditions.

As previously stated the temperature of the cooling medium admitted to the coils 12 and 22 is under hygrostat control and for this purpose a reverse acting hygrostat 65 is located in the room 5 and is of the pneumatic type, being supplied with air pressure from the main pressure supply line 61. It will be understood that, as with the thermostat 60, the sensitive parts of the hygrostat can be located in the recirculated air duct 11 or that enclosure air can be brought to these sensitive parts if it is convenient to locate the hygrostat on a remote instrument board. The outlet line 66 from the reverse acting hygrostat 65 connects with a thermostat 67 having its sensitive parts located in the cooling medium supply branch 31 to the fresh air coil 22 and also connects with a similar thermostat 68 having its sensitive parts in the cooling medium supply branch 36 to the recirculated air coil 12. The outlet line 69 from the thermostat 67 connects directly with the three-way diaphragm valve 43 in the refrigerating medium return pipe 32 and the outlet line 70 from the thermostat 68 connects directly with the three-way diaphragm valve 45 in the refrigerating medium return pipe 37 from the recirculated air coil 12. The purpose of the thermostats 67 and 68 is to prevent the hygrostat 65 from raising the entering cooling medium temperature above that required to stop dehumidification and at all times maintain the maximum inlet water temperature low enough to cool the air the required amount.

In the control of the entering temperature of the cooling medium to the cooling coils 22 and 12 it will be understood that the pumps 33 and 38 serve to dilute the cooling medium supplied to the cooling coils with relatively warm return or spent cooling medium from these coils. The three-way diaphragm valves 43 and 45 serve to permit a greater or less amount of the return water from the coils to be so directly returned to the inlet branches of the cooling coils and therefore these three-way diaphragm valves operate to control the temperature of the water admitted to the coils. As the relative humidity in the room 5 rises, the pressure in the outlet line 66 from the reverse acting hygrostat 65 drops and this pressure drop is transmitted through the thermostats 67 and 68 to function the three-way diaphragm valves 43 and 45 to cut down the amount of cooling medium admitted, respectively, to the pumps 33 and 38 and increase the amount of cooling medium returned through the common pipe 41 to the refrigerating apparatus (not shown). This, of course, cuts down the dilution of the incoming cooling medium to the coils 12 and 22 by the spent cooling medium and hence lowers the temperature of the cooling medium admitted to the coils. Both of the pumps 33 and 38 are kept running as long as dehumidification or cooling is required.

In order to reduce the amount of refrigeration required in the summertime and also to reduce the heating required in the wintertime means are provided for reducing the amount of air handled by the air conditioning apparatus when the load in the room is decreased and less heating or cooling and ventilation is required. This means is functioned by the direct acting thermostat 60 and since the conditions are exactly reversed, of course, when heating, as compared with cooling, it will be seen that a reversal in the action of the thermostat must take place. To this end the various diaphragm valves included in the system operate within certain air pressure ranges which, for convenience, will be discussed in the subsequent description of the operation of the apparatus.

The amount of air admitted to the enclosure is controlled by dampers 75 which are actuated by a direct acting motor 76. The inward movement of the operating arm of this motor is limited by a stop 77, this stop limiting the closing movement of the dampers 75 so as to insure, at all times, a minimum amount of air supplied to the enclosure 5. The outlet line of the thermostat 60 is connected with a snap relay 78 and the outlet line 79 of this snap relay is in turn connected with a three-way diaphragm valve 80. This three-way diaphragm valve has one inlet connection with the outlet line 62 from the direct acting thermostat 60 and its outlet is connected by a line 81 with the damper motor 76. During summer operation when cooling is required, the outlet pressure of the direct acting thermostat is such as to cause the snap relay 78 to disconnect its outlet li..e 79 from the main pressure supply line 61 under which condition no pressure is impressed upon the diaphragm of the valve 80 and its outlet line 81 is connected with the thermostat outlet line 62 so that the air motor 76 is under direct control of the direct acting thermostat 60. Consequently, as the room temperature falls toward the setting of the direct acting thermostat 60 the outlet pressure in its outlet line 62 and also in the damper motor line 81 likewise drops, causing the damper motor to close the dampers proportionately. Of course, when the temperature in the room 5 reaches the setting of the thermostat no cooling is required and consequently at this point the dampers 75 are closed to their maximum extent, which can be half way.

When heating in the wintertime the outlet pressure of the thermostat 60 in line 62 is such as to cause the snap relay to admit the full 15 pounds pressure from the main pressure supply line 61 to its outlet line 79 and under this condition the three-way diaphragm valve 80 is operated to disconnect its outlet line from the thermostat outlet line 62 and instead connect the outlet line 81 with a line 85 which is the outlet line from a reverse acting relay 86. The outlet line 62 from the direct acting thermostat 60 connects with and functions this reverse acting relay 86 and it is supplied with air pressure from the main pressure supply line 61 for its operation. Thus, in the wintertime when heating is required the action of the thermostat 60 on the dampers 75 is reversed by the reverse acting relay 86 so that as the temperature in the room 5 rises to the setting of the thermostat 60, the rising pressure in its outlet line 62 causes a falling pressure in the outlet line 85 to the reverse acting relay 86 and this progressively closes the dampers 75 until they are half way closed, i. e. their maximum extent, when the temperature of the room reaches the setting of the thermostat.

For winter operation the outlet line 62 from the thermostat 60 connects with a direct acting diaphragm valve 87 which in conjunction with the thermostat 60 admits more steam from a steam supply line to the heater 15 as the room temperature drops. Also during winter operation the hygrostat 56 functions a reverse acting diaphragm valve 88 which admits water from a line 89 to the sprays 13 so as to humidify the air admitted to the enclosure until the setting of the hygrostat is reached.

It is also desirable to place a barrier or baffle means in the tubes of the cooling coil which preferably impose a minimum restriction to the flow of the refrigerant but serve to create a turbulence in the flowing refrigerant even at extremely low rates of flow thereof. By so maintaining a turbulent condition at very low rates of flow, a high transfer rate is maintained between the liquid refrigerant and the cooling surface or tubes. Any suitable means such as a twisted ribbon 95 or spiral wire (not shown) in the tubes of the cooling coil will do. The purpose of this ribbon is to maintain a high rate of heat transfer, commonly known as K value, when dehumidification is required with a minimum removal of sensible heat. Thus, even at low rates of flow, the refrigerating medium rises rapidly in temperature and maintains the initial (first) water pass) of the cooling coil well below the dewpoint of the passing air to effect dehumidification thereof. This ribbon 95 would not be used with a direct expansion of refrigeration in the cooling coils as the bubbles formed by the expansion maintain the necessary turbulence even at low rates of flow of the refrigerant.

*Operation*

In the summertime when cooling is required, air from the room is withdrawn through the duct 11 and lower passage 10, through the serpentine cooling coil 12 and beyond the partition 9 mixes with fresh air drawn in through the fresh air inlet 20 and past the fresh air cooling coils 22. The mixed air is drawn into the fan 17 and is discharged past the dampers 75 through the fan outlet 18 into the room. It will be understood that the leakage around the doors and windows of the enclosure 5 permits the escape of sufficient air so that an excessive pressure is not built up in the enclosure. At the same time a refrigerating medium, such as brine, from the cooler (not shown) of a conventional refrigerating apparatus is supplied under pressure and preferably at a constant temperature from the pipe 30 through the two branches 31 and 36 leading to the inlet headers 25 and 23 of the fresh air cooling coil 22 and recirculated air cooling coil 12, respectively. In these cooling coils the air flows counter-current to the refrigerant flow so that in passing the several passes of each coil the air is progressively cooled and upon reaching the last or coldest pass, that portion of the air actually coming in contact with this pass will be dehumidified. The air, however, leaves the coils at a temperature substantially above its dewpoint. The fresh air cooling coil 22 is much longer in the direction of air flow than the recirculated air coil inasmuch as the greater cooling is performed on the fresh air which is generally more moist and humid than the recirculated air, the recirculated air being, of course, substantially at the temperature and relative humidity desired. For this reason the fresh air cooling coil 22 is also always operative as long as cooling is to be performed and the cooling medium is admitted in substantial quantities to the recirculated air cooling coil only when the heat load in the room rises above the capacity of the fresh air cooling coil.

The essence of the present invention resides in the control of the rate of flow of the cooling medium through the coils in response to the dry bulb temperature of the room and the control of the entering temperature of the refrigerating medium to the coils in response to the relative humidity in the room. It has been found that when the rate of flow of a cooling medium of constant temperature is increased, the cooling effect of the coil, i. e. its effect in removing sensible heat from the air, is increased proportionately, but that any increase in its effect in performing dehumidification by the removal of latent heat is relatively slight. Greater cooling occurs because of the increase in the amount of refrigerant flow for the reason that a greater flow increases the mean temperature difference between the water and flowing air, inasmuch as more water to do the same amount of cooling results in lower mean temperature of the water flowing through the coil. However, the increase in the flow of the cooling medium has a relatively slight effect upon the dehumidifying action of the coil in removing latent heat. This occurs because cooling of the air will always occur if the water is at a lower temperature than the air. However, no dehumidifying of the air can occur unless the initial or entering temperature of the water is appreciably lower (3–5° F.) than the dewpoint of the air. Accordingly, the present invention proposes to control the amount of dehumidifying by controlling the initial temperature of the refrigerating medium in response to the relative humidity of the room to effect the desired dehumidifying. When no dehumidifying is required the initial temperature of the water will be too high (very little below the dewpoint of the air) to cause moisture to condense out of the air and yet the water will be cool enough to do the necessary cooling. When the entering temperature of the cooling medium is below the dewpoint of the air so that dehumidification takes place, an increase in the rate of flow has a relatively slight effect upon the dehumidifying action of the coil. Accordingly, it will be seen that a thermostat control of the rate of flow will provide the desired dry bulb temperature in the room but will have little effect in adjusting the removal of moisture and will have no effect at all if the initial temperature of the cooling medium is too high to effect condensation.

As the air passes through the cooling coils it is progressively cooled by the colder and colder passes so that when it reaches the end of the coil it is near its dewpoint. If the entering temperature of the cooling medium is appreciably below the dewpoint of the air, that portion of the precooled air which strikes the final pass or passes of the cooling coil will be chilled below its dewpoint so that dehumidification takes place. The amount of this dehumidification is directly dependent upon the entering temperature of the cooling medium and hence by adjusting this entering temperature in accordance with the relative humidity in the room it will be seen that an exact control of the relative humidity can be obtained. Of course, decreasing the temperature of the entering cooling medium tends to decrease the mean temperature difference between the cooling coil and the air so that more sensible heat would be removed. However, if this cooling is excessive it will be seen that the thermostat in the enclosure will cut down the rate of flow so that the coil will remove sensible heat only to the extent required.

It will therefore be seen that by such a system an extremely accurate control of both the relative humidity and the temperature in the room can be obtained, a condition which is particularly important in processing moisture or heat sensitive materials. Further, it will be seen that there is a saving in refrigerant since at no time is useless dehumidification performed in order to bring down the dry bulb temperature of the room, nor is there useless removal of sensible heat in order to secure dehumidification. It will be appreciated that this is particularly important as many systems now in use require the use of a reheating coil to heat the air after it has been cooled to the necessary low degree for the purposes of dehumidification in order to bring its temperature up to that required to maintain the required temperature in the room, such an expedient being, of course, extremely wasteful of refrigeration.

Assuming the air in the enclosure to be too high in dry bulb temperature, the thermostat 60 delivers rising air pressure to line 62 which will deliver air at relatively high pressure (12 or 13 pounds) so as to hold the reverse acting valves 50 and 53 wide open, allowing the maximum volume of cooling medium to flow through both the fresh air coil 22 and the recirculated air coil 12, thereby to provide the maximum cooling of the passing air at the particular entering temperature of the cooling medium then being maintained by the hygrostat 65. As the room temperature falls the thermostat 60 causes the pressure in its outlet line 62 to drop first closing the valve 53 so as to reduce the flow of refrigerating medium through the branch pipe 26 and recirculation air coil 12 and then closing the valve 50 so as to reduce the flow of cooling medium through the branch pipe 31 and fresh air coil 22. These valves 50 and 53 may overlap in operation but essentially the volumetric flow of cooling medium is first reduced by the valve 53 and then by the valve 50 so that cooling is performed on the fresh air alone when minimum cooling is required, since the fresh air is usually warmer than recirculation air. The valves 50 and 53 are completely functioned at a control air pressure in line 62 of between 12 and 8 pounds. Each of these valves is provided with a hand controlled valved by-pass 52 and 55 to allow a desired minimum flow of water for effecting dehumidification by the fresh and recirculated air cooling coils when the valves 50 and 53 are completely closed by the thermostat 60.

At controlling air pressures above 7.5 pounds in the outlet line 62 from the thermostat 60 the snap relay 78 is held in the position in which it admits full air pressure from the main air pressure supply line 61 to the diaphragm valve 80 so that the diaphragm valve 80 connects the diaphragm motor 76 with the thermostat outlet line 62. Therefore, the drop in pressure in the thermostat outlet line 62 due to falling room temperature caused by increased cooling and approaching that which the thermostat is desired to maintain actuates the motor 76 to gradually close the damper 75 until the stop 77 is encountered.

This closing of the dampers 75 occurs with falling pressure in the thermostat outlet line 62 from 13 to 8 pounds and therefore occurs substantially simultaneously with the reduction in the admission of cooling medium to the cooling coils by the valves 50 and 53. It will therefore be seen that during cooling operation as the heat load in the room drops and less cooling is required, the amount of air delivered to the room is also reduced. It will be appreciated that in order to accomplish cooling a sufficient volume or weight of air must be treated so that this air delivered into the enclosure will absorb the maximum heat load at a predetermined maximum differential temperature between the room air and the incoming air as it is not advisable, for reasons of comfort, to deliver air at too cold a temperature. It therefore follows that at any time when the heat load is less than maximum, either the temperature differential between the incoming air and the room air, or the volume or weight of air admitted to the enclosure, can be reduced in proportion or both the temperature differential and the volume can be reduced. Assuming that the maximum allowable temperature differential between the incoming air and the enclosure air be 15°, such as with a room temperature of 75° F. and air delivered to the room at 60° F. and that 1000 pounds per minute of air must be delivered to absorb the maximum heat load which would be 3600 B. t. u. per minute it will be seen that if the heat load is reduced to one-half or 1800 B. t. u. per minute, then in order to maintain the room temperature constant the differential temperature between the incoming and room air must be reduced to 7.5° or any combination of the two that will give a common product which will equal the heat load.

It will be seen that the present invention provides maximum air volume when maximum cooling is required. Were it not for the requirements of ventilation and air movement in the enclosure no air would need to be handled if no cooling were required. In practice it has been found that under light load conditions a reduction to approximately one-half the maximum air volume can be safely used when minimum cooling or heating is required and at the same time maintain satisfactory air conditions.

The entire operation as above described, is, of course, reversed on rising room temperatures.

Assuming that the air in the enclosure 5 has too high a relative humidity, since the hygrostat 65 is reverse acting and gives falling air pressure to its outlet 66 with rising relative humidity the pressure in its outlet line 66 and in the lines 69 and 70 to the three-way valves 43 and 45 will be low, and hence the cooling medium will all be returned through the common pipe 41 to be re-cooled by the refrigerating apparatus (not shown). Under this condition the cooling medium is supplied to the fresh and recirculated air cooling coils at minimum temperature from the refrigerating medium supply line, thus accomplishing the maximum amount of dehumidification of both fresh and recirculated air. The pumps 33 and 38 are kept running whenever cooling or dehumidifying is required and as the relative humidity falls the pressure in lines 66, 69 and 70 rises from 2 to 7 pounds, in which range of rising pressure and falling relative humidity the three-way valve 45 first functions to direct an increasing flow of spent cooling medium through the recirculation pump 38 to the inlet branch 36, of the recirculated air coil 12, thereby diluting the cooling medium admitted to this coil and causing the temperature of the cooling medium entering this coil to rise and thereafter to do likewise with the three-way valve 43, causing this valve to divert increasing amounts of spent water through the pump 33 so as to dilute the cooling medium admitted to the fresh air coil and raise the entering temperature of the water in the fresh air coil. This increase in the entering temperature of the cooling medium admitted to the fresh and recirculated air cooling coils reduces the amount of dehumidifying performed by these coils. These three-way diaphragm valves 43 and 45 may overlap in this operation but with falling relative humidity the valve 43 in the fresh air cooling medium system will function after the three-way valve 45 in the recirculated air system to increase the dilution of the refrigerating medium since more dehumidification of fresh air is likely to be required when cooling is needed.

The thermostats 67 and 68 are set to maintain a maximum temperature to which the hygrostat 65 may raise the entering temperature of the cooling medium to the coils. This temperature which these thermostats are set to maintain should be about 3 or 4° below the desired dewpoint temperature required in the room. This is to prevent the hygrostat from raising the entering cooling medium temperature above that required to stop dehumidification so that the entering water temperature is still low enough to cool the air the required amount. In acting to prevent the entering temperature of the cooling medium from rising above this predetermined minimum each of these limiting thermostats 67 and 68 throttle the air pressure to the respective three-way diaphragm valves 43 and 45 so that these valves cannot function to increase the entering temperature of the cooling medium beyond from 3 to 4° below the dewpoint of the air handled.

Thus, if the weather is very hot but very dry the fresh air admitted in the enclosure 5 lowers its relative humidity. This, of course, raises the pressure in the hygrostat outlet line 66 until the diaphragm valves 43 and 45 are functioned to return the maximum amount of spent cooling water to the pumps 35 and 39 which return this water directly to the inlet branch pipes of the cooling coils. If all the water to the coils were permitted to be recirculated it will be seen that no cooling would take place and consequently the temperature in the room 5 would rise to the outside temperature or higher. To avoid this the thermostats 67 and 68 insure that the diaphragm valves 43 and 45 can never completely cut off the refrigerating medium from the pipe 30 and insure that the temperature of the entering cooling medium can never rise above a temperature of 3 or 4° below the dewpoint of the air in the enclosure so that cooling will be done even though dehumidification is not required.

Under the condition just assumed, that is, extremely hot and dry weather, the relative humidity in the room will fall, thereby functioning the reverse acting hygrostat 65 to raise the pressure in its outlet line 66. When this pressure rises to 8 pounds the reverse acting diaphragm valve 88 commences to open so as to admit water to the humidifying sprays 13 and thereby humidify the air admitted to the room 5 and maintain the desired relative humidity therein. The diaphragm valve 88 is moved from its completely off to its maximum open positions under pressures in the hygrostat outlet line of from 8 to 13 pounds.

On the other hand if the outside conditions are such that the air is cool and moist the fall in temperature in the enclosure 8 will first function the direct acting thermostat 60 to cause a drop in pressure in its outlet line 62. When this pressure drops to 8 pounds both of the diaphragm valves 50 and 53 are completely closed, the diaphragm valve 50 controlling the admission of cooling medium to the fresh air coil being functioned from full on to off under a range of pressure from 11 to 8 pounds and the diaphragm valve 53 controlling the admission of cooling medium to the recirculated air coils being functioned from full on to off under a range of pressure of from 13 to 10 pounds. This reduces the flow of cooling medium through the cooling coils to the maximum extent but the by-passes 51 and 54 permit a minimum flow. Since under the outside conditions assumed, i. e. low temperature and high relative humidity, the relative humidity in the room is high, the low outlet pressure in the hygrostat outlet line holds the diaphragm valves 43 and 45 in the positions in which a relatively small amount, if any, of the water is permitted to be pumped by the pumps 35 and 39 to the inlet pipes of the cooling coils. Consequently, even though the cooling medium admitted to the cooling coils is at minimum rate of flow it is at minimum temperature and therefore the coils perform a substantial amount of dehumidification even though with relatively small amount of cooling.

If this operation of the air conditioning apparatus on a very cool and moist day tends to result in too low a temperature in the enclosure 5, the pressure in the thermostat outlet line 62 falls. When this pressure drops to 7 pounds the direct acting diaphragm valve 87 commences to open, admitting steam to the heating coils 15. This direct acting diaphragm valve 87 is operated from full off to on under a thermostat outlet pressure range of from 7 to 2 pounds. The heating of the air, of course, not only prevents the room temperature from dropping below the desired minimum but also decreases the relative humidity of the air admitted so that the pressure in the hygrostat outlet line 66 rises and first functions the diaphragm valve 45 to recirculate increasing amounts of spent water through the recirculated air coil 12 until the maximum amount is so recirculated and this coil neither cools nor dehumidifies to any appreciable extent and second, to function the diaphragm valve 43 to increase the temperature of the cooling medium admitted to the fresh air coil 22. For this purpose the three-way valve 45 operates under pressures of from 2 to 5 pounds in the hygrostat outlet line to effect a change from 0 to the maximum admission and recirculation of spent cooling medium in the recirculated air cooling coil 12 by the pump 38 and the three-way valve 43 operates under pressures of from 3 to 7 pounds in the hygrostat outlet line 62 to effect a change from 0 to the maximum admission and recirculation of spent cooling medium in the fresh air cooling coil 22 by the pump 33.

Under all conditions of operation before steam is admitted to the heater 15 the snap relay 78 is actuated to place the dampers 75 under control of the thermostat 60 through the reverse acting relay 86 instead of directly. The direct acting diaphragm valve 87 does not open until the pressure in the thermostat outlet line 62 drops to 7 pounds. Before this occurs and at 7.5 pounds pressure in the thermostat outlet line 62 the snap relay 78 is actuated so as to admit air pressure at the full 15 pounds in the supply line 61 to its outlet line 79 and the diaphragm of the three-way valve 80. This pressure actuates the three-way valve 80 to disconnect its outlet line 81 from the thermostat outlet line 62 and instead connect this outlet line 81 with the outlet line 85 from the reverse acting relay 86. The reverse acting relay merely reverses the pressure in its outlet line 85 as compared with the thermostat outlet line 62. At the time the snap relay operates there is no difference between the 7.5 pounds pressure in the thermostat outlet line 62 and the reverse acting outlet line 85 but as the pressure in the thermostat outlet line 62 drops in response to falling room temperature the pressure in the reverse acting relay outlet line 85 and the line 81 rises in exact proportion and this rising pressure causes the motor 76 to open the dampers 75 proportionately. At the time of operation of the snap relay 76 the dampers 75 are always closed to their maximum extent, because regardless of whether heating or cooling is being performed the load upon the apparatus during the time of change over from heating to cooling or vice versa is always alike. As the temperature within the room continues to fall due to an increase in load the pressure in the thermostat outlet line drops to 7 pounds so as to open the direct acting steam valve 87 and then to continue opening this steam valve until 2 pounds is reached. When 2 pounds is reached the heating system is working under maximum load conditions and at this time 13 pounds of pressure is imposed upon the motor 76 and the dampers 75 are held wide open. The damper motor 76 operates under pressures of 13 to 8 pounds to move the dampers 75 from fully open to one-half closed positions.

During winter operation the apparatus is principally employed for heating and humidifying. It is apparent that at the lower temperatures carried in the room 5 during winter operation the reverse acting hygrostat 65 serves to regulate the amount of humidification by the sprays 13 during winter operation and that the direct acting thermostat 60 serves to regulate the amount of steam admitted to the coil 15 and also the total amount of air admitted to the room by means of the dampers 75 in accordance with the heat load. When winter definitely sets in the cooling system is put out of operation in any suitable manner. This is, of course, desirable since otherwise the by-pass pipes 51 and 54 would permit the minimum amount of cooling medium to circulate through the cooling coils and also the thermostats 67 and 68 would hold the temperature of the cooling medium at its maximum temperature close to the dewpoint of the air in the room. Such useless circulation of cooling medium through the cooling coils would merely be wasteful of refrigeration during winter operation and hence the cooling system is rendered inoperative at this season.

In order to prevent the freezing of any water in the apparatus during extremely low outside temperatures the usual preheater 21 in the fresh air duct is provided, the admission of steam from a steam line 90 being under control of a diaphragm valve 91 which is responsive to a thermostat 92 in the fresh air duct. Such a preheater is, of course, the usual expedient and forms no part of the present invention.

In the apparatus shown the entire operation from maximum cooling to maximum heating takes place under a room temperature change of 2 to 3° and the entire operation of the air conditioning apparatus from maximum dehumidification to maximum humidification takes place under a 4% change in the relative humidity in the room.

It will therefore be seen that the method and apparatus forming the subject of my invention provides a simple and efficient system for holding the temperature of a room within a few degrees both during winter and also during the summer and also holds a constant relative humidity within 4%. It will further be observed that by hygrostatically controlling the temperature of the entering cooling medium and thermostatically controlling its amount an accurate control of the temperature and relative humidity during summer operation is obtained without waste of refrigeration in uselessly cooling to secure the necessary dehumidification or uselessly dehumidifying to secure cooling.

I claim as my invention:

1. The method of cooling and dehumidifying the air in an enclosure which consists in passing air and a cooling medium in heat exchanging counterflow relation, delivering the cooled air to the enclosure, maintaining the maximum initial temperature of said cooling medium at all times at a point near the dewpoint of the air in the enclosure and regulating the minimum initial temperature of said cooling medium in response to the relative humidity in the enclosure.

2. The method of cooling and dehumidifying the air in an enclosure which consists in passing air and a cooling medium in heat exchanging counterflow relation, delivering the cooled air to the enclosure, regulating the rate of flow of said cooling medium in response to the dry bulb temperature in the enclosure, regulating the initial temperature of the cooling medium in response to the relative humidity of the air in the enclosure and reducing the amount of cooled air delivered to the enclosure in response to a decrease in the temperature of the air in the enclosure below a point at which minimum cooling is effected by said cooling medium.

3. In an apparatus for cooling and dehumidifying an enclosure, a multiple pass cooling coil, means for passing air through said cooling coil over the exterior of the pipes thereof and delivering the air to the enclosure, means for passing a cooling medium through the interior of the pipes of said cooling coil countercurrent to the air flow, means for maintaining the maximum entering temperature of said cooling medium at all times at a point near the dewpoint of the air in the enclosure and means responsive to the relative humidity of the air in the enclosure for regulating the minimum entering temperature of the cooling medium.

4. In an apparatus for cooling and dehumidifying an enclosure, a multiple pass cooling coil, means for passing air through said cooling coil over the exterior of the pipes thereof and delivering the air to the enclosure, means for passing a cooling medium through the interior of the pipes of said cooling coil countercurrent to the air flow, a thermostat responsive to the temperature of said cooling medium for maintaining the maximum entering temperature of said cooling medium at all times at a point near the dewpoint of the air in the enclosure and means responsive to the relative humidity of the air in the enclosure for regulating the minimum entering temperature of the cooling medium.

5. In an apparatus for cooling and dehumidifying an enclosure, a multiple pass cooling coil, means for withdrawing air from said enclosure and passing it through said coil around the exterior of the pipes thereof, means for separately withdrawing fresh air and passing it through said coil without mixture with said enclosure air around the exterior of the pipes thereof, means for subsequently mixing the cooled fresh and cooled enclosure air and returning it to said enclosure, means for passing a cooling medium through the interior of said pipes countercurrent to the air flow, means controlling the minimum temperature of said cooling medium entering said coil in response to the relative humidity of the air within said enclosure, means controlling the rate of flow of said cooling medium through said coil in response to the dry bulb temperature of the air in said enclosure, means providing a maximum temperature of the cooling medium entering the coil at a point near the dewpoint of the air in the enclosure and means providing a minimum rate of flow of the cooling medium through said coil under all conditions of cooling operation.

6. In an apparatus for cooling and dehumidifying an enclosure, a multiple pass fresh air cooling coil, a multiple pass enclosure air cooling coil, means for withdrawing fresh air and passing it around the exterior of the pipes of said fresh air cooling coil, means for withdrawing air from said enclosure and passing it around the exterior of the pipes of said enclosure air cooling coil, means for mixing the cooled fresh and cooled enclosure air and passing it to said enclosure, means for passing a cooling medium through the interior of the pipes of each coil countercurrent to the air flow, means for lowering the temperature of the cooling medium entering the fresh air cooling coil in response to a rising relative humidity in said enclosure, and means for lowering the temperature of the cooling medium entering the enclosure air cooling coil in response to a further rise in the relative humidity in said enclosure.

7. In an apparatus for cooling and dehumidifying an enclosure, a multiple pass fresh air cooling coil, a multiple pass enclosure air cooling coil, means for withdrawing fresh air and passing it around the exterior of the pipes of said fresh air cooling coil, means for withdrawing air from said enclosure and passing it around the exterior of the pipes of said enclosure air cooling coil, means for mixing the cooled fresh and enclosure air and passing it to said enclosure, means for passing a cooling medium through the interior of the pipes of each coil countercurrent to the air flow, means for lowering the temperature of the cooling medium entering the fresh air cooling coil in response to a rising relative humidity in said enclosure, means for increasing the rate of flow of said cooling medium through said fresh air coil in response to a rising dry bulb temperature in said enclosure, means for lowering the temperature of the cooling medium entering the enclosure air cooling coil in response to a further rise in relative humidity in said enclosure and means for increasing the rate of flow of said cooling medium through said enclosure air cooling coil in response to a further rise in dry bulb temperature in said enclosure.

8. In an apparatus for cooling and dehumidifying the air in an enclosure, a multiple pass fresh air cooling coil, a multiple pass enclosure air cooling coil, means for withdrawing fresh air and passing it through and around the exterior of the pipes of said fresh air cooling coil, means for withdrawing air from said enclosure and passing it through and around the exterior of the pipes of said enclosure air cooling coil, means for mixing the cooled fresh and enclosure air and passing it to said enclosure, means for passing a cooling medium through the interior of the pipes of each coil countercurrent to the air flow, said cooling medium being supplied at a temperature below the dewpoint of the air in the enclosure, a dry bulb thermostat and a hygrostat having their sensitive parts responsive to the air conditions within the enclosure, a valve in the cooling medium supply line to said fresh air cooling coil, means operatively connecting said valve with said thermostat to open said valve on an initial rise in temperature in said enclosure, a cooling medium by-pass around said valve and providing a minimum flow of cooling medium through said fresh air cooling coil at all times, a valve in the cooling medium supply pipe to said enclosure air cooling coil, means operatively connecting said last valve with said thermostat to open said last valve on a further rise in temperature in said enclosure, a cooling medium by-pass around said last valve and providing a minimum flow of cooling medium through said enclosure air cooling coil at all times, a by-pass pipe connecting the outlet of said enclosure air cooling coil with the supply pipe thereto in advance of said first valve, a three-way valve controlling the amount of spent cooling medium returned through said by-pass pipe, means operatively connecting said three-way valve with said hygrostat to increase the amount of cooling medium returned through said by-pass pipe in response to an initial fall in relative humidity in said enclosure, a by-pass pipe connecting the outlet of said fresh air coil with the supply pipe thereto in advance of said last fluid inlet control valve, a three-way valve controlling the amount of spent cooling medium returned through said last by-pass pipe, means operatively connecting said hygrostat with said last three-way valve to increase the amount of cooling medium returned through said last by-pass pipe in response to a continued fall in relative humidity in said enclosure, and means responsive to the temperature of the cooling medium entering said coils to prevent each of said three-way valves from admitting spent cooling medium through the respective by-pass pipes beyond a point at which the temperature of the cooling medium entering either coil is substantially above the dewpoint of the air in the enclosure.

9. In an apparatus for conditioning the air in an enclosure, cooling means, heating means, means for drawing air through said cooling and heating means and delivering the air into said enclosure, a dry bulb thermostat responsive to the temperature of the air in said enclosure and operating in a low temperature and high temperature range, means actuated by said thermostat during its operation in its high temperature range for rendering said heating means inoperative and regulating said cooling means in accordance with changes in the character of the air in the enclosure, said thermostat actuated means rendering said cooling means substantially inoperative when the enclosure temperature passes to the low temperature range of said thermostat and rendering said heating means operative and under control of said thermostat in accordance with changes in enclosure air conditions, means for regulating the amount of air delivered to the enclosure, means actuated by said thermostat during one range for controlling said air regulating means in accordance with changes in the character of the air in the enclosure, and means for reversing the action of said thermostat on said regulating means on passing to the other range.

10. In an apparatus for cooling and dehumidifying an enclosure, a multiple pass fresh air cooling coil, a multiple pass enclosure air cooling coil, means for withdrawing fresh air and passing it around the exterior of the pipes of said fresh air cooling coil, means for withdrawing air from said enclosure and passing it around the exterior of the pipes of said enclosure air cooling coil, means for passing a cooling medium through the inside of the pipes of both coils countercurrent to the flow of air and at an entering temperature below the dewpoint of the passing air whereby the passing air is dehumidified and cooled, means responsive to the relative humidity in the enclosure for regulating the initial temperature of the cooling medium entering said coils, means for increasing the rate of flow of the cooling medium through said fresh air cooling coil in response to a rise in the dry bulb temperature in said enclosure and means for increasing the rate of flow of the cooling medium through said enclosure air cooling coil in response to a further rise in the dry bulb temperature in the enclosure.

CLAUDE A. BULKELEY.